Patented Apr. 22, 1952

2,593,652

UNITED STATES PATENT OFFICE 2,593,652

PROCESS OF MAKING SOLUBLE SOLID SILICATES

Louis Blanchard, Saint Cloud, France, assignor to Societe Anonyme des Manufactures des Glaces et Produits Chimiques de Saint-Gobain, Chauny & Cirey, Paris, France No Drawing. Application July 31, 1947, Serial No. 765,269. In France May 26, 1944

Section 1, Public Law 690, August 8, 1946
Patent expires May 26, 1964

15 Claims. (Cl. 23—110)

This invention relates to the manufacture of new solid silicates of alkaline metals that are water soluble in the cold and that do not tend to agglomerate on standing or on heating. The invention also relates to a new process by which the new compounds are made. The most widely used silicates of alkaline metals are the silicates of sodium and the silicates of potassium, and the specification will be particularly directed to those members of the class, but the invention is not to be limited by the cost and extent of use of any member of the class.

It has long been known to make silicates of sodium by the alkaline fusion of silica and that from the glass-like material thus obtained solutions can be prepared. At the same time it has been necessary to operate under pressure at elevated temperature to obtain these solutions because the silicates have been of little solubility in the cold. The solutions can be used in particular as detergents, as adhesives, as binding materials, and as surfacings. Consequently, the solutions themselves have been the articles of commerce, because prior to this invention the silicates have not been readily put into solution by the user. Because the solutions are so much more readily and quickly employed by the user, they have occupied the market to the substantial exclusion of the silicates themselves. This has required the employment of larger containers for shipment and the shipment of considerable bulks of water in every shipment of the solution.

It has also been known that while the anhydrous silicates, which are being considered, are of slight solubility in the cold, even when reduced to powder form, their hydrates are more soluble, which has contributed to the establishment of several processes for making the hydrates, either by the hydration of anhydrous sodium silicates or by concentration of the commercial solutions. In order to obtain a total solution of such hydrates in the cold, it is not only necessary that they should be finely crushed, but furthermore that the grains coming from the crushing shall not agglomerate. Attempts have been attended by economical and technical difficulties and with difficulties of complexity.

The present invention has for one object to prepare sodium silicates that are directly and completely soluble in cold water, that are granular, and that do not tend to agglomerate on standing at normal temperature or even on heating, and which consequently are new products of commercial value heretofore unknown.

Another object of the invention is to prepare these silicates of alkaline metals and particularly of sodium and potassium, by a simple process having no technical intricacies and no economical objections.

The objects of the invention are attained, generally speaking, by making solid soluble silicates of alkaline metals having a ratio of $SiO_2$ to $Na_2O$ or its equivalent in the range 2.5 to 4, a water content circa 20%, that is in transparent grains wholly soluble in water at 20 degrees C., and that does not tend to agglomerate even as the temperature is raised. This product is consequently capable of being shipped and stored in the dry state and of being immediately dissolved in cold water when needed. These products are granular and very homogeneous.

The objects of the invention are accomplished, as to process, by a method that involves the concentration of solutions containing silicates having a particular ratio of silica to soda or its equivalent. The concentration is carried out to an end point that may be variously determined by the viscosity of the solution or by its water content or by a tendency to gelatinize and then by cooling to produce the gel. The gel, when prepared in accordance with the principles of the invention, is of such character that it is readily crumbled in the fingers and is easily broken up into regular and fine divisions by mechanical means. The divided gel is then dried in the cold, and after this drying has proceeded for a certain period of time, or to a certain water content, it is my discovery that the product no longer tends to agglomerate when heated. Thereafter, a further drying at elevated temperature may be carried out to reduce the water content to what may be regarded as a practical optimum.

The invention includes a combination of surprising discoveries by the applicant in accordance with which, in the first place, certain solutions of sodium silicate (for instance) take at a certain concentration, by chilling to ambient temperature, a particular consistency which is that of a material plastic, pliant, amorphous, and vitreous, and which when it is heated shows no trace of crystallization but progressively becomes liquid.

The applicant has equally established the fact that despite the physical appearance of the material it is pulverizable with the greatest facility and that, for instance, the simple pressure of the fingers can reduce it to dust. If concentration is more dilute the silicate remains fluid in the cold while if it is more concentrated it acquires the consistency of a material that is plastic, elastic, and so hard that to crumble it is extremely difficult.

The process of making solid sodium silicates that are soluble in the cold according to this invention is characterized by a process having the following steps, generally speaking:

In the first place it must be determined that the silicate of soda from which one wishes to work satisfies specified conditions for the value of the ratio R which refers to the ratio of $SiO_2$ to $Na_2O$ in the sodium silicate. This ratio also applies to potassium silicate and to the other alkaline metal silicates. Having determined that the chosen silicate is within the range the solution is concentrated in order to obtain a particular concentration. The concentrated solution is then cooled if need be and then the mass, which is gelled, is broken up. A complete dehydration is then carried out by particular steps upon the broken mass.

For the practical application of this process it is advantageous to observe the following operative procedure:

The concentration of the selected solution of sodium silicate preferably proceeds at atmospheric pressure. It may be effectuated by heating over the open flame or on an oil or water bath. Whatever the method of heating, care should be taken to prevent the overheating of the walls of the vessel in which the concentration takes place which would cause the formation of crusts prejudicial to homogeneity. In consequence, it is preferable to operate under partial vacuum within appropriate apparatus, or more simply, by heating the solution to a temperature below its boiling point and to accelerate evaporation by bubbling a current of air through it.

The end point for the first concentration may be variously determined. For instance, it may be carried out until a water content of 44 to 46% is obtained. Again, it may be carried out until its viscosity has so increased that it almost stops the flow of air. A third method of determining the end point is to remove a test sample of the solution from the concentration from time to time until a sample gels when cooled to ambient temperature. When the concentration has proceeded to the point where a gel will form when the mass is cooled to ambient temperature, cooling is employed, preferably with disruptive agitation, and the product formed is a divided gel. The gelling may be completed and the product, which breaks up easily, may be broken up in a subsequent operation.

The product thus finely divided is dehydrated in the cold and for this purpose a current of air may be forced through it in order to hasten the drying. At the same time the product should be worked disruptively to prevent the agglomeration of the grains. When the water content has been reduced sufficiently, a point is reached at which the product, when heated, no longer tends to agglomerate. After this point has been passed, the dehydration may be continued at elevated temperature, the disruptive working being advantageously pursued during both parts of the drying, the working during the drying at elevated temperature having the object of making the effects of drying more homogeneous and thus ameliorating the quality of the product.

It is a notable feature of the invention that the operative characteristics of the invention as applied to sodium silicates are applicable without change to potassium silicates. In particular the value of R is the same for the silicates of soda and the silicates of potassium, being between 2.5 and 4, the concentration to which it is advisable to bring the aqueous solution before cooling. Gelling is the same and extends from 44 to 54% water following a relationship that is seemingly direct when the ratio R varies from 2.5 to 4, the value R=2.5 being that beneath which the silicates of potassium or of sodium are no longer possessed of sufficient friability, and the value R=4 being that above which the silicates produced are too vitreous and cannot be dissolved even at elevated temperature. The following examples illustrate the invention:

*Example I*

A solution of silicate of soda of which R=2.58, containing 62% of water, is heated to accelerate evaporation until its water content is between 45 and 46%. The liquid is then cooled to ambient temperature at which it is transformed to a gel. The product is then crumbled and thereafter the silicate is dried in the cold, this drying being continued until the water content is below 31%. Then the dehydration is continued at 50 degrees C. until a water content of 23.4% is attained.

The final product is granulated. The grains are transparent, shiny and have curved edges. Their dimensions are of the order of a millimeter. The silicate is soluble, as is, at 20 degrees C. in less than 15 minutes with agitation that does not need to be vigorous, in water. It gives a limpid solution.

*Example II*

A solution of tri-silicate of sodium, of which R=2.85 and which contains 62% of water is heated until its water content is 48%. The liquid is then chilled to ambient temperature and the gelled product is broken up. Immediately after crumbling the silicate is dried in the cold to a water content of 35% or even 29%. Thereafter, the product is dried at a temperature attaining 50 degrees C. The product is thus dried until a water content of 21.5% is present. This product discloses no tendency to reagglomerate. It has the same appearance as the product of Example I.

*Example III*

A solution of silicate of soda in which R=3.26 is prepared. The concentration is made by bubbling air freed from carbon dioxide in the liquor which is heated on a water bath and agitated. Because of the cooling introduced by the bubbling air the temperature does not go too high, attaining about 60 to 70 degrees C. Nevertheless, it suffices to reduce the liquor to a pasty state. When the water content is not more than 53%, it is allowed to cool which brings the silicate to an easily friable gel state. The product is then finely frittered. This operation is equally easy, if not easier, for silicates having a higher alkaline content. The drying of the frittered product is made first in large basins exposed to air in which intermittent mixing is carried out to oppose reagglomeration. The drying occupies several days. When the water content of the silicate falls to 40 to 44% the silicate, always friable, is crumbled still more finely. The tendency to reagglomeration having been reduced, the temperature is raised to 50 degrees C. The complete operation may be carried out in a rotary drier traversed by a current of hot air circulating in a direction opposed to that of the product, if desired.

*Example IV*

The solution of silicate of soda in which R=3.67 is treated as in the preceding example with the exceptions of the following modifications: The first concentration is stopped before crumbling when the water content reaches 53.8%. The drying at elevated temperature is commenced when the water content reaches 45 to 48%.

Example V

A solution of potassium silicate having the ratio R=2.5 (SiO₂ to K₂O) and having 71.2% of water is concentrated by bubbling decarbonated air through the liquor with agitation and heating on a water bath. The temperature of the water bath is 100 degrees C., whereas that of the liquor is maintained at about 80 degrees C. The liquor is concentrated to the point where the viscosity approaches the maximum that is compatible with the passage of a current of air. The liquor obtained has a water content of 46%. It is then chilled to ambient temperature at which it is transformed to a gel. The product is then broken up and immediately afterward is dried in the cold, this drying being continued until the water content is lowered to 30%, after which the dehydration is continued at 50 degrees C. until the water content is only 16.6%. The final product is granulated, soluble as it is at 20 degrees C., and gives a limpid solution.

Example VI

A solution of silicate of potassium having the ratio R=3.1 and containing 72.6% of water is heated until its water content is reduced to 50%. The liquor is then chilled to ambient temperature and the product is broken up. Immediately after the breaking, the silicate is dried in the cold to a 30% water content. Thence forward the drying is continued at 50 degrees C. The product has the same appearance as that of Example V and does not tend to reagglomerate.

Example VII

A solution of potassium silicate having a ratio R=3.65 and containing 73.6% of water is heated until its water content is 52%. The liquor is then cooled to ambient temperature and the product is broken up. After the breaking, the silicate is dried in the cold to 30% of water and then at 50 degrees C. The dry product at that temperature has a water content of 22%. Its appearance is that of Example V, and it has no tendency to reagglomerate.

As a result of the foregoing examples and of many others, the applicant believes that he may safely postulate the following theories without being bound to any particular theory of operation.

A. The property of friability or crumbling varies as a function of the molecular ratio of SiO₂ to Na₂O and that friability is not present unless the value of R is superior to about 2.5. Below that value of R the property of friability disappears.

B. For a silicate having a value of R between 2.5 and 4, the friability is produced in a certain range of concentration, and there is an optimum value of this concentration at which the friability is most easily produced.

C. When the value of R is between 2.5 and 4 the water content corresponding to the optimum concentration increases regularly from about 44 to 54% following a direct relation.

D. If the product of the first powdering is left to itself it tends slowly to agglomerate in a mass. If, on the other hand, the product is dried while working it, it loses this tendency to agglomerate. This drying may be wholly carried out in the cold and must be carried out in the cold in its first stages because of the danger of fusion.

All the silicates obtained by this invention, as evidenced by the preceding examples, are perfectly soluble in the cold. In particular it has been verified that when these products are used in a proportion of 50 grams for 75 cubic centimeters of water, their solubility is total. Their solubility tends to diminish when working with more dilute solutions. At the same time, even with proportions of 1% of silicate in the water, it has been observed that with products sufficiently dry that have no tendency to reagglomerate, a solubility of 100% at 20 degrees C. is obtained for silicates having R values 2.58 and 2.85, whereas for silicates of R value 3.26 a solubility of 83% is attained and for those having a ratio of 3.67 a 75% solubility exists at this 1% concentration. These figures, based upon dilute solutions, are given to put in evidence the great superiority of the products of this invention compared to those of the prior art, and in particular over the process of drying on a heated drum. The silicate of 2.85 obtained by the heating drum gives in solution at 1% very variable solubilities because the product is not homogeneous, the mean of these figures being below 50% solubility. It is also noted that the products obtained heretofore having a water content as low as those of the solid silicates resulting from this invention do not dissolve at 20 degrees C. except partially, for instance 80% under the same conditions. The products obtained by this invention give excellent results and are very homogeneous.

The drying should be carried out so far that the product will no longer have a tendency to reagglomerate. However, extreme drying tends to produce silicates that are of less solubility so that the range indicated in the specification, being in all ways satisfactory, should be adopted under ordinary circumstances.

Inasmuch as these new products are completely soluble in cold water they may be shipped and stored dry and dissolved by the user. This is a very great advantage.

As many apparently widely different embodiments of the present invention may be made without departing from the spirit and scope thereof, it is to be understood that the invention is not limited to the specific embodiments except as defined in the appended claims.

What is claimed is:

1. The method of making dry potassium silicate that includes the steps of concentrating a solution of potassium silicate having a ratio $$\frac{SiO_2}{K_2O}$$

in the range from $$\frac{2.5}{1} \text{ to } \frac{4}{1}$$

to a water content in the range 44–54%, cooling the mass to form a gel, drying the gel at atmospheric temperature until the product no longer exhibits agglomeration as the temperature is raised, and completing the drying at elevated temperature.

2. The method of making dry potassium silicate that includes the steps of concentrating a solution of potassium silicate having a ratio SiO₂ to K₂O within the range 2.5 to 4 until the water content is 46%, gelling the mass, crumbling the gel, drying the crumbled gel to about 30% water at atmospheric temperature, and drying it to about 17% water at about 50 degrees C.

3. The method of making dry potassium silicate that includes the steps of concentrating a solution of potassium silicate having a ratio of $SiO_2$ to $K_2O$ between 2.5 and 4 by heating it and bubbling air through it until the water content of the solution is in the range 44–54%, cooling the mass until a gel is produced, crumbling the gel, drying the crumbled gel to about 30% water at atmospheric temperature, and drying it to about 16% water at about 50° C.

4. The method of making dry potassium silicate that includes the steps of concentrating a solution of potassium silicate having a ratio $SiO_2$ to $K_2O$ of 2.5 by bubbling decarbonated air through it at about 80 degrees C. until the water content of the solution is in the range 44–54%, cooling the mass until a gel is produced, crumbling the gel, drying the crumbled gel to about 30% water at atmospheric temperature, and drying it to about 16% water at about 50 degrees C.

5. The method of making potassium silicate that includes the step of concentrating a solution of potassium silicate having 71.2% water and a ratio of $SiO_2$ to $K_2O$ of 2.5 over a water bath until the water content is 44–54%, cooling the mass to atmospheric temperature to produce a gel, crumbling the gel, drying the crumbled gel to about 30% water in the cold, and drying it to 16.6% water at about 50 degrees C.

6. The method of making a solid soluble silicate of sodium that includes the steps of subjecting a solution of sodium silicate having a ratio of $SiO_2$ to $Na_2O$ of 2.58 to concentration until its water content is reduced to 44 to 46%, cooling the liquid to atmospheric temperature, dividing the product, and drying it in the cold until its water content is about 31%, and drying further at 50 degrees C. until the water content is reduced to about 23.4%.

7. The method of making solid soluble silicate that includes the steps of concentrating a solution of sodium silicate of which the ratio $SiO_2$ to $Na_2O$ is about 2.58 until the water content is reduced to about 44 to 46%, cooling to atmospheric temperature, drying the product at atmospheric temperature until its water content is about 31%, and drying at elevated temperature until its water content is about 23.4%.

8. The process of making solid soluble sodium silicate that includes the steps of concentrating a solution of sodium silicate having a ratio $SiO_2$ to $Na_2O$ within the range 2.5 to 4 to a water content of 44–54%, gelling the mass, dividing it, drying it in the cold until it no longer exhibits a tendency to agglomerate, and completing the drying at elevated temperature.

9. The method of making soluble solid silicates of alkali metals that includes the steps of concentrating a solution of an alkali metal silicate in which a ratio of $SiO_2$ to metal oxide is in the range 2.5 to 4 to a water content of about 44–54%, cooling it to atmospheric temperature, dividing it, drying it at atmospheric temperature until the product no longer exhibits a tendency to agglomerate when heated, and completing the drying at elevated temperature.

10. The method of making soluble solid silicates of alkali metals that includes the steps of concentrating a solution of an alkali metal silicate having a ratio of $SiO_2$ to metal oxide in the range of 2.5 to 4 to a water content in the range 44–54%, gelling the product at atmospheric temperature, drying the gel at atmospheric temperature with disruptive working, sampling the product from time to time and heating the samples and completing the drying at elevated temperature when the heated samples do not agglomerate.

11. The method of making soluble solid silicates of alkaline metals that includes the steps of concentrating a solution of an alkaline metal silicate having a ratio of $SiO_2$ to metal oxide in the range 2.5 to 4 to a water content in the range 44–54%, gelling the product at atmospheric temperature, and drying the gel at atmospheric temperature with disruptive working until samples of the product no longer agglomerate on heating.

12. The method of making a dry, water soluble alkali metal silicate that includes the steps of concentrating a water solution of the alkali metal silicate, having a ratio of $SiO_2$ to metal oxide falling within a range equivalent to 2.5 to 4 by heating below its boiling point to an end point indicating a water content of 44 to 54%, cooling the mass with disruptive agitation, dehydrating the divided mass in the cold, heating samples of the mass from time to time until a sample does not agglomerate, and drying the mass at elevated temperature.

13. The method of making a dry, water soluble alkali metal silicate that includes the steps of concentrating a water solution of the alkali metal silicate, having a ratio of $SiO_2$ to metal oxide falling within a range equivalent to 2.5 to 4, by heating it below boiling to a water content of 44–54%, cooling and crumbling the product, dehydrating the product with agitation at atmospheric temperature, heating samples of the product from time to time until a sample does not tend to agglomerate on heating, and drying the product at about 50° C.

14. The method of making a dry, water soluble, alkali metal silicate that includes the steps of concentrating a water solution of the alkali metal silicate, having a ratio of $SiO_2$ to metal oxide falling within a range equivalent to 2.5–4, by heating it below boiling to a water content of 44–54%, cooling and crumbling the product, with agitation at atmospheric temperature to a water content on the order of 30–40%.

15. The method of making a dry, water soluble alkali metal silicate that comprises evaporating a solution of an alkali metal silicate containing a ratio of $SiO_2$ to metal oxide in the range 2.5–4 to a water content of 44–54%, cooling and crumbling the product, dehydrating the product with working at atmospheric temperature, subjecting samples thereof to heating during dehdyration, and subjecting the mass to drying at about 50° C. after such a sample does not agglomerate on heating.

LOUIS BLANCHARD.

REFERENCES CITED

The following references are of record in the file of this patent:

UNITED STATES PATENTS

| Number | Name | Date |
|---|---|---|
| 1,111,918 | Paterson | Sept. 29, 1914 |

FOREIGN PATENTS

| Number | Country | Date |
|---|---|---|
| 528,374 | Great Britain | Oct. 28, 1940 |

OTHER REFERENCES

Ordway, "American Journal of Science, Series 2," vol. 32, pages 341–342 (1861).